United States Patent
Anders et al.

(10) Patent No.: US 10,817,711 B2
(45) Date of Patent: *Oct. 27, 2020

(54) DETERMINING A NEED FOR A WORKSPACE GRAPHICAL NOTATION TO INCREASE USER ENGAGEMENT

(71) Applicant: International Business Machines Corporation, Armonk, NY (US)

(72) Inventors: Kelley Anders, East New Market, MD (US); Jeremy R. Fox, Georgetown, TX (US); Jonathan Dunne, Dublin (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/013,352

(22) Filed: Jun. 20, 2018

(65) Prior Publication Data

US 2019/0392203 A1 Dec. 26, 2019

(51) Int. Cl.
*G06K 9/00* (2006.01)
*G06Q 10/10* (2012.01)
*G06K 9/62* (2006.01)
*H04N 7/15* (2006.01)

(52) U.S. Cl.
CPC ....... *G06K 9/00315* (2013.01); *G06K 9/6218* (2013.01); *G06Q 10/101* (2013.01); *H04N 7/15* (2013.01)

(58) Field of Classification Search
CPC ......... H04L 65/403; H04N 7/147; H04N 7/15
See application file for complete search history.

(56) References Cited

U.S. PATENT DOCUMENTS

| | | | |
|---|---|---|---|
| 7,248,677 B2 | 7/2007 | Randall et al. | |
| 9,280,761 B2 | 3/2016 | Sharpiro et al. | |
| 9,773,231 B2 | 9/2017 | Libin | |
| 2009/0199093 A1 | 8/2009 | Chakravarty | |
| 2012/0284635 A1 | 11/2012 | Sitrick et al. | |
| 2014/0358613 A1* | 12/2014 | Libin | G06Q 10/1095 705/7.19 |
| 2016/0042226 A1* | 2/2016 | Cunico | H04N 7/147 382/103 |
| 2017/0078615 A1 | 3/2017 | Coen | |
| 2017/0177928 A1 | 6/2017 | Cunico et al. | |

OTHER PUBLICATIONS

American Art Therapy Association, "Art Therapy", https://www.arttherapy.org/upload/2017_DefinitionofProfession.pdf, Jun. 2017, 1 page.

(Continued)

*Primary Examiner* — Ross Varndell
(74) *Attorney, Agent, or Firm* — Maeve M. Carpenter; Hunter E. Webb; Keohane & D'Alessandro, PLLC

(57) ABSTRACT

Approaches presented herein enable enhancing user engagement during a video conference. A user introduces (e.g., creates) a graphical notation during the video conference. If a correlation exists betwen the graphical notation and the video conference, then the graphical notation can be dynamically shared with any particpants found to be disinterested or confused as a motivation to understand a concept or to act as a catalyst for additional graphical notations.

5 Claims, 8 Drawing Sheets

(56) References Cited

OTHER PUBLICATIONS

Varndell, Ross E., U.S. Appl. No. 16/503,693, Office Action dated Mar. 6, 2020, P201706546US02, 16 pgs.
Appendix P, "List of IBM Patents or Patent Applications Treated as Related", Mar. 20, 2020, 2 pages.
Varndell, Ross E, U.S. Appl. No. 16/503,693, Notice of Allowance dated Jun. 24, 2020, 9 pgs.

* cited by examiner

DETERMINING A NEED FOR A WORKSPACE GRAPHICAL NOTATION TO INCREASE USER ENGAGEMENT

TECHNICAL FIELD

The subject matter of this invention relates generally to content delivery. More specifically, aspects of the present invention provide a solution for enhancing user engagement during a video conference.

BACKGROUND

Computing devices can be accessed at almost any time and any place and can contain a tremendous amount of information relating to people, organizations, general interests, etc. In fact, many people choose to share information about themselves with others, such as through a social network or through a journal. Such information can include thoughts, interests, photos, and anything else someone wants to share. In addition, organizations retain information relating to an organizational hierarchy, job titles and descriptions, as well as information relating to each employee, projects, competitors, and so forth.

In various organizations today, there is a tremendous amount of time spent preparing for meetings and attending those meetings, as well as other tasks related to meetings (e.g., action items). Sometimes meetings can be productive and worthwhile for both the participant and the organization. Meetings should allow participants the opportunity to achieve common goals while mitigating the amount of wasted time, regardless if the attendees are sitting around a table or around the country. Remote meetings have become an essential part of a workflow, or even the only way of communication in various teams across the globe. Keeping meeting participants focused and engaged is vital to the productivity of the session. Meetings should be more than merely isolated events, but should be a piece of an overall collaborative framework or organizational goal.

SUMMARY

In general, embodiments of the present invention provide for enhancing user engagement during a video conference. A user introduces (e.g., creates) a graphical notation during the video conference. If a correlation exists between the graphical notation and the video conference, then the graphical notation can be dynamically shared with any particpants found to be disinterested or confused as a motivation to understand a concept or to act as a catalyst for additional graphical notations.

One aspect of the present invention includes a computer-implemented method for increasing user engagement in a video conference, comprising: estimating a user engagement status of a first participant; identifying, based on the user engagement status, a second participant who has introduced a graphical notation; determining whether a correlation exists between the graphical notation and the video conference; prompting, when a correlation exists between the graphical notation and video conference, the second participant to share the graphical notation with the first participant; and dynamically displaying, in response to an affirmative response from the second participant, the graphical notation to the first participant.

Another aspect of the present invention includes a computer program product embodied in a computer readable medium that, when executed by a computer device, performs a method for increasing user engagement in a video conference, the method comprising: estimating a user engagement status of a first participant; identifying, based on the user engagement status, a second participant who has introduced a graphical notation; determining whether a correlation exists between the graphical notation and the video conference; prompting, when a correlation exists between the graphical notation and video conference, the second participant to share the graphical notation with the first participant; and dynamically displaying, in response to an affirmative response from the second participant, the graphical notation to the first participant.

Yet another aspect of the present invention includes a system for increasing user engagement in a video conference, comprising: a memory medium comprising instructions; a bus coupled to the memory medium; and a processor coupled to the bus that when executing the instructions causes the system to perform a method, comprising: estimating a user engagement status of a first participant; identifying, based on the user engagement status, a second participant who has introduced a graphical notation; determining whether a correlation exists between the graphical notation and the video conference; prompting, when a correlation exists between the graphical notation and video conference, the second participant to share the graphical notation with the first participant; and dynamically displaying, in response to an affirmative response from the second participant, the graphical notation to the first participant.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
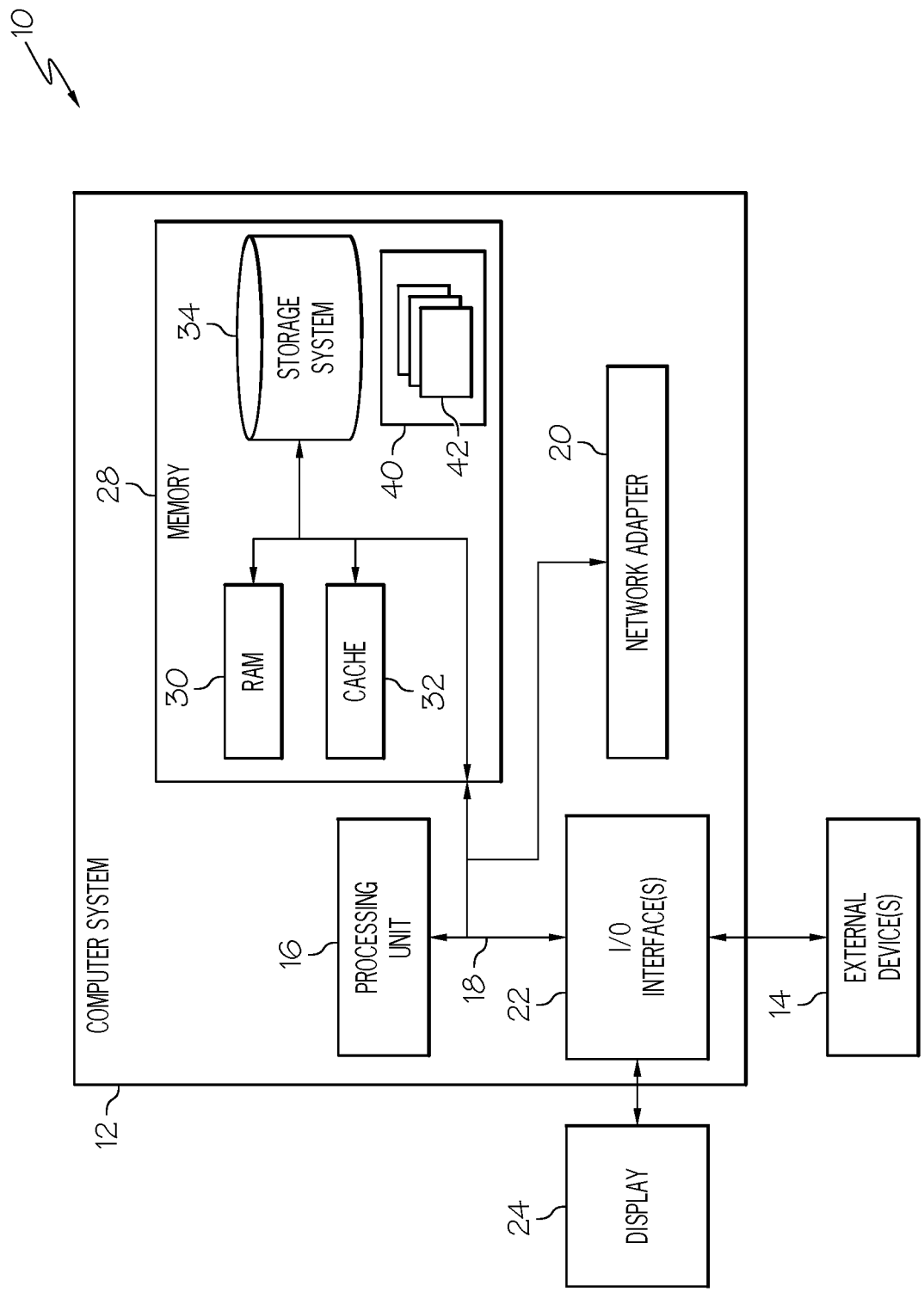
FIG. 1 shows an architecture 10 in which the invention may be implemented according to an illustrative embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

Graphical notations, colloquially referred to as "doodles", can be generally defined as simple drawings that can have concrete representational meaning or may just be composed of random and abstract lines. In the first context, doodling can have practical and powerful applications. Mathematicians and scientists can use graphical notations to explain complex theories and equations. Business people can use graphical notations to map business plans and strategies. People from all walks of life are doodling to help them communicate and to give visual representation and meaning to their ideas and to help others.

As stated above, embodiments of the present invention provide for enhancing user engagement during a video conference. A user introduces (e.g., creates) a graphical notation during the video conference. If a correlation exists betwen the graphical notation and the video conference, then the graphical notation can be dynamically shared with any particpants found to be disinterested or confused as a motivation to understand a concept or to act as a catalyst for additional graphical notations.

Referring now to FIG. 1, a computerized implementation 10 of an embodiment for determining, based on a dynamic analysis of user engagement during a video conference, a need for a workspace graphical notation to increase user engagement in the video conference will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for determining, based on a dynamic analysis of user engagement during a video conference, a need for a workspace graphical notation to increase user engagement in the video conference. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for determining, based on a dynamic analysis of user engagement during a video conference, a need for a workspace graphical notation to increase user engagement in the video conference, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
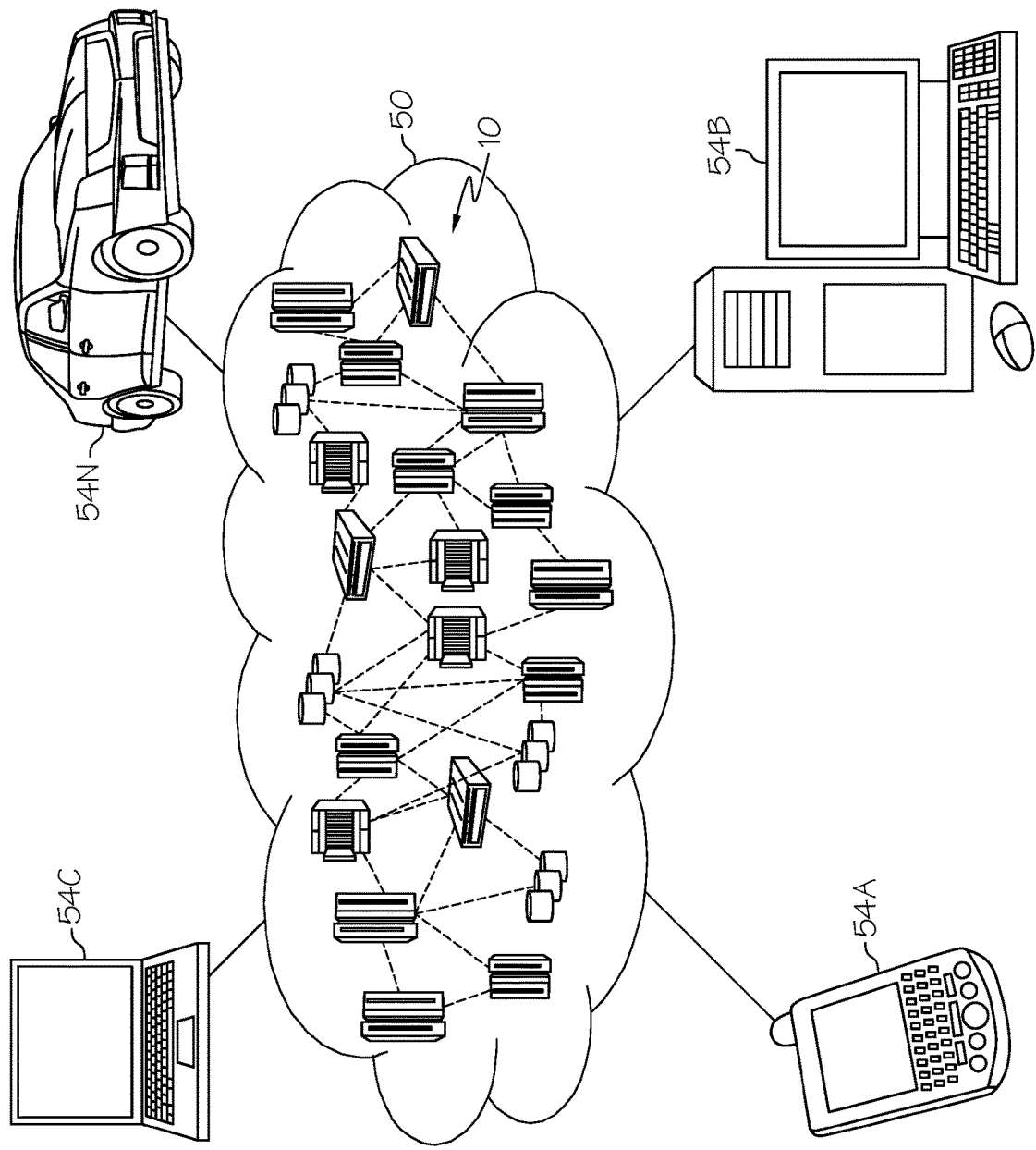
FIG. 2 depicts a cloud computing environment according to an illustrative embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
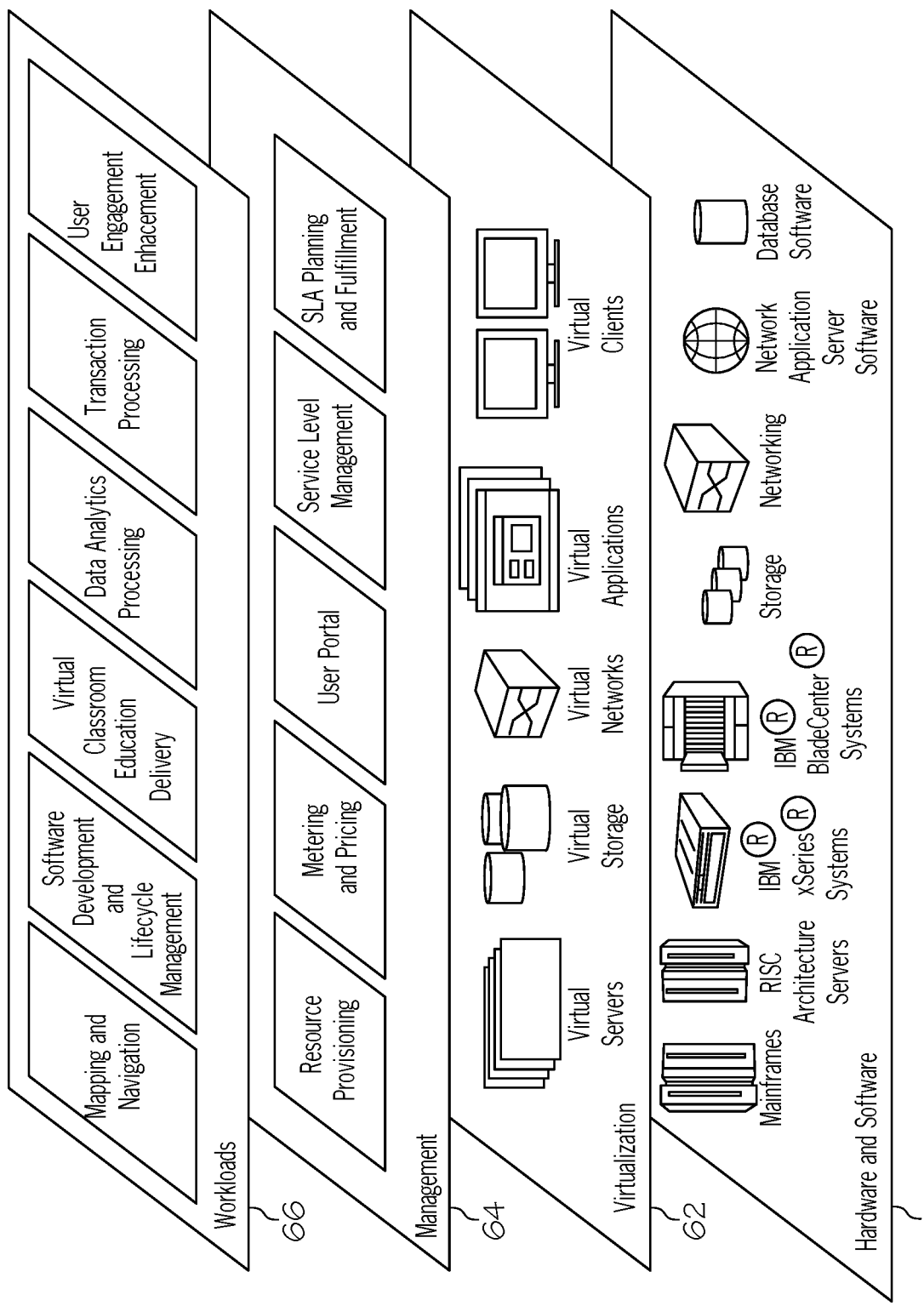
FIG. 3 depicts abstraction model layers according to an illustrative embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. Further shown in workloads layer 66 is user engagement enhancement, which represents the functionality that is provided under the embodiments of the present invention. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
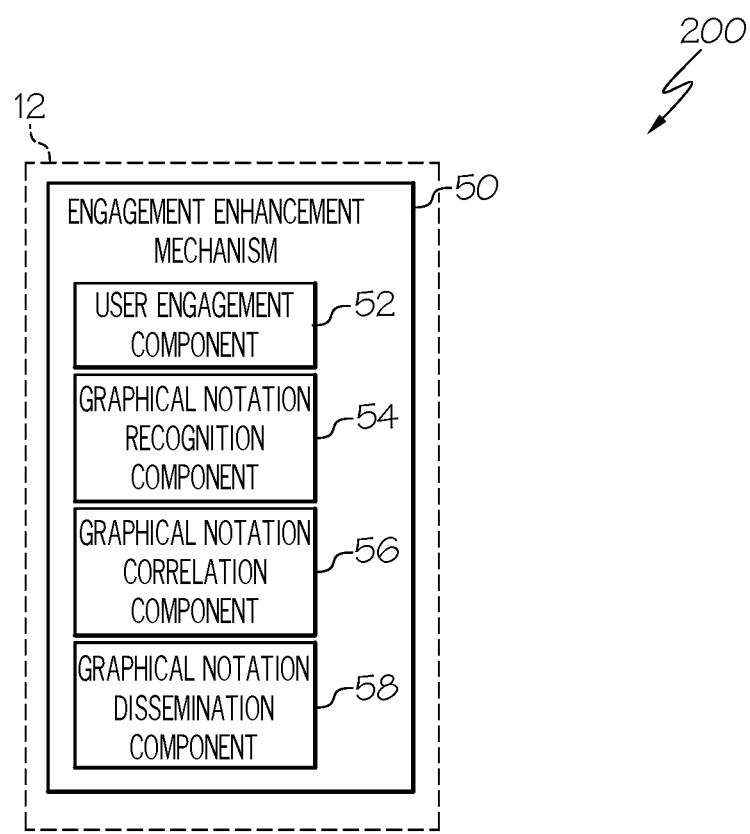
FIG. 4 shows a first schematic diagram 200 illustrating an exemplary environment for implementation according to an illustrative embodiment of the present invention.

Referring now to FIG. 4, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a user engagement enhancement mechanism 50 (hereinafter "system 50"). Rather, system 50 could be loaded on a server or server-capable device that communicates (e.g., wirelessly) with the physical server for enhancing user engagement during a video conference. In a typical embodiment, however, system 50 or components of system 50 may reside within a screen connected to an electronic device capable of performing the functions described herein.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 4 for brevity purposes. As shown, system 50 includes user engagement component 52, graphical notation recognition component 54, graphical notation correlation component 56, and graphical notation dissemination component 58. The functions/acts of each component is described in detail below.

User engagement component 52, as executed by computer system/server 12, is configured to estimate a participant engagement status during a video conference. A video conference is a live, visual connection between two or more participants residing in separate locations for the purpose of communication. At its simplest, video conferencing provides transmission of static images and text between two locations. At its most sophisticated, it provides transmission of full-motion video images and high-quality audio between multiple locations.

For each participant sharing video in a video conference, an associated video channel can be analyzed using facial recognition technology to determine an engagement status (e.g., actively participating, disinterested, confused, etc.) of the participant with regard to the video conference. Since existing facial recognition technology can detect facial features and movements, it can also ascertain emotions or mental states. If a participant's mouth curls upwards, for instance, it can be inferred that the participant is happy since the facial movement indicates a smile or laughter. Facial recognition technology can be used on a video sequence to track the fluctuations and strengths of emotion over time, and even capture "microexpressions," or little flickers of emotion that pass over a participant's face before she can control herself or is even aware she has registered an emotion.

Alternatively or in addition, user engagement component 52 may be configured to analyze each video channel to detect physical indicia of interest of a video conference participant. In an embodiment, determining physical indicia of interest includes determining the position of the eyes of a participant using gaze tracking techniques. For example, user engagement component 52 uses the position and orientation of each eye to determine where the participant is looking relative to a display used in the video conference. By determining where the participant is looking, user engagement component 52 can determine whether the participant is focusing on the display. If the participant is determined to be focusing on the display, the user engagement component 52 determines on what portion of the screen the participant is focusing. User engagement component 52 then uses this information to estimate a level of engagement for the participant with regard to the video conference. For example, a participant's facial expression and movement can indicate disinterest or confusion during an ongoing video conference.

In another embodiment, the physical indicia of interest determined from the visual information includes a position of a participant's head. By analyzing the position of the participant's head, user engagement component 52 is able to estimate where the participant is looking and, consequently, determine whether the user is looking at the display. User engagement component 52 then estimates user engagement in the video conference. In yet other embodiment, the determined physical indicia of interest can include a body lean of a participant. For example, a participant slouched over his desk can indicate disinterest in the video conference. In any case, user engagement 52 may estimate, based on a particpant's facial expressions and movements and/or physical indicia of interest, an engagement status for a participant sharing video during a video conference.

Graphical notation recognition component 54, as executed by computer system/server 12, is configured to detect when a graphical notation (e.g., a graphical notation) has been introduced during a video conference. In an example, a user may create a graphical notation in real time during a video conference using an application installed on her device. The application may be provided strictly for doodling/sketching or simply have doodling functionality along with other functionality. The graphical notation may be created using an input device and/or one or more virtual drawing tools (e.g., a line tool, a circle tool, a freehand drawing tool, a text tool, etc.). In another example, a user may open an existing graphical notation using an application capable of presenting the graphical notation to the user on a display. The existing graphical notation can include one that has been scanned by the user from a hard copy. The hard copy can include an original document, paper copy, printout, and/or any record that can be read without the use of any device. Similarly, the existing graphical notation may include a photo of an existing graphical notation, either from a screenshot or hard copy graphical notation. In any case, graphical notation recognition component 54 can detect when a graphical notation has been introduced by a user during a video conference.

Graphical notation correlation component 56, as executed by computer system/server 12, is configured to identify whether a correlation exists between a graphical notation (e.g., a graphical notation) and a video conference. For example, a video conference including several participants may be conducted to discuss altering an existing business process. As the video conference begins, assume an initial flow diagram of the existing business process is shared to a device of each participant as a basis for the discussion. Assume that a conference participant, Joan, begins doodling using a doodling application on her device. The graphical notation is detected and graphical notation correlation component 56 determines whether a correlation exists between Joan's graphical notation and the meeting. If no correlation exists, no action is taken regarding the graphical notation. These steps are described in greater detail below.

Figure 5:
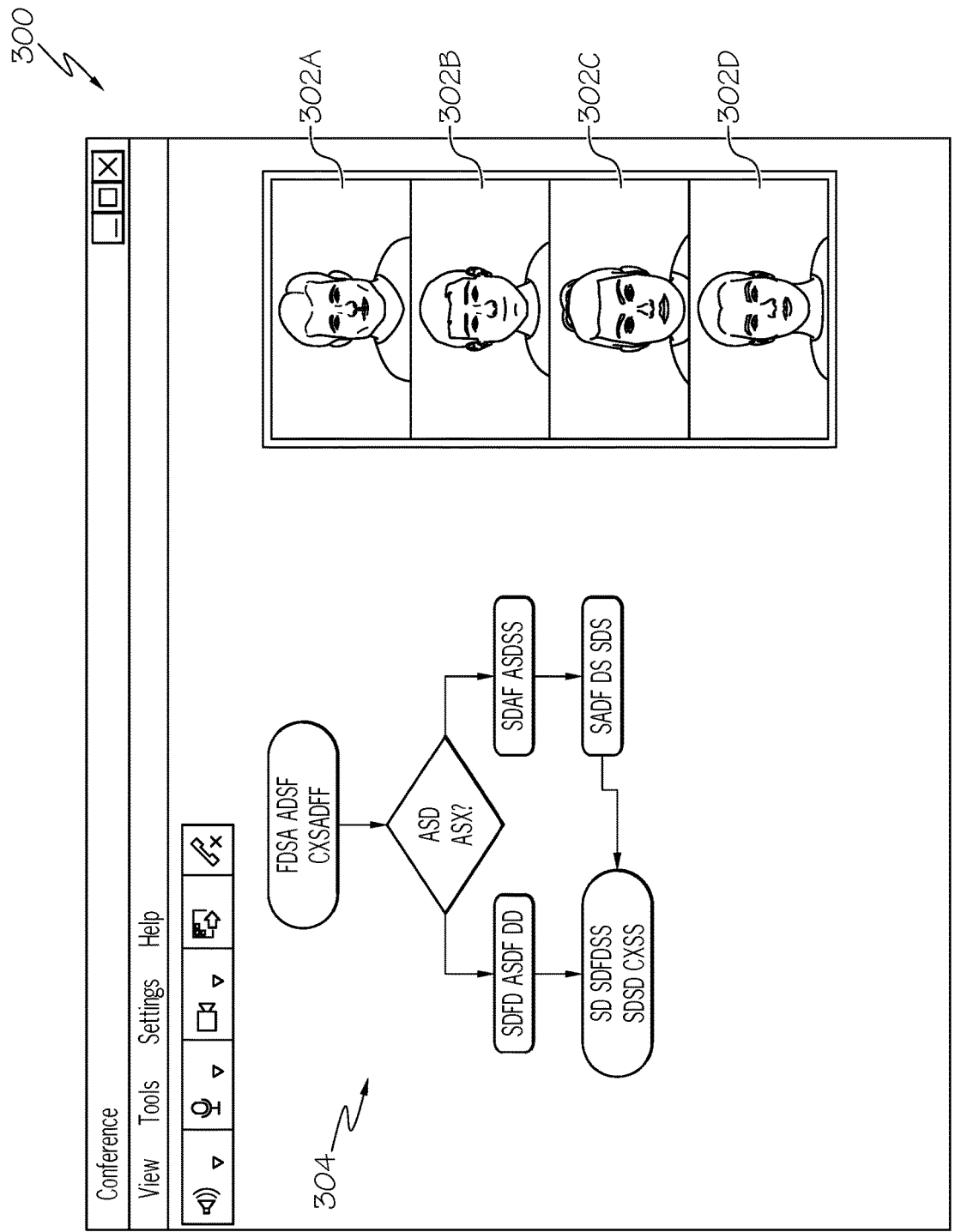
FIG. 5 shows an example display 300 of a user participating in a video conference according to an illustrative embodiment of the present invention.

FIG. 5 shows an example display 300 of a user particpating in a video conference. As shown, display 300 shows the other participants in the meeting: Abe 302A, Carl 302B, Betty 302C, and Debbie 302D. Assume that Joan (not pictured) is using display 300. Also shown is diagram 304 which is shared among the participants. Diagram 304 shows an initial flow diagram of a business process. As stated, the discussion focuses on potential changes that can be made to the business process. Assume the conversation takes several twists causing some confusion in Abe 302A as to what has been agreed upon. User engagement component 52 identifies the confusion with Abe 302A based on his facial expressions and/or body language. Further, graphical notation recognition component 54 detects that Joan is doodling directly on her instance of diagram 304 as the discussion proceeds. Graphical notation correlation component 56 then determines whether a correlation exists between her graphical notation and the ongoing discussion.

Graphical notation correlation component 56 may identify whether a correlation exists between a graphical notation (e.g., a graphical notation) and a video conference. If so, the graphical notation could be used as a motivation to understand a concept or to act as a catalyst for additional graphical notations. In an embodiment, a clustering technique, such as as K-means clustering, can be used to make such a determination regarding correlation. Graphical notation correlation component 56 can use any number of points (or coordinates) from any number of previous graphical notation and/or existing images as a baseline. Previous graphical notation and/or existing images for this purpose may reside in a baseline database (not shown). Baseline database can use any type of database structure (e.g., relational, hierarchical, etc.) to store previous graphical notation (e.g., graphical notations), existing images, any associated text related to the graphical notations/images, and/or the like.

As additional lines/sketches are drawn, graphical notation correlation component 56 can use the baseline to determine if the new graphical notation is aligned to the initial baseline. In an embodiment, cartesian coordinates and their co-variances can be used to determine whether an alignment exists between the new graphical notation and the initial baseline. If there is an alignment, this can serve as evidence to infer a correlation between the current graphical notation and previous graphical notations and/or existing images. If there is a lack of alignment, this can serve as evidence to infer a lack of correlation.

As stated, k-means clustering may be used to determine a correlation related to a new graphical notation. K-means clustering is a type of unsupervised learning, which is used against unlabeled data (i.e., data without defined categories or groups). The goal of this algorithm is to find groups in the data, with the number of groups represented by the variable K. The algorithm works iteratively to assign each data point to one of K groups based on the features that are provided. Data points are clustered based on feature similarity. The results of the K-means clustering algorithm include the centroids of the K clusters, which can be used to label new data, and labels for the training data (i.e., each data point is assigned to a single cluster). Rather than defining groups before looking at the data, clustering allows for finding and analyzing the groups that have formed organically. Each centroid of a cluster is a collection of feature values which define the resulting groups. Examining the centroid feature weights can be used to qualitatively interpret what kind of group each cluster represents. In any case, a clustering technique can be in this context to determine whether either an existing graphical notation could be used as a motivation to understand a concept or to act as a catalyst for additional graphical notations.

Figure 6:
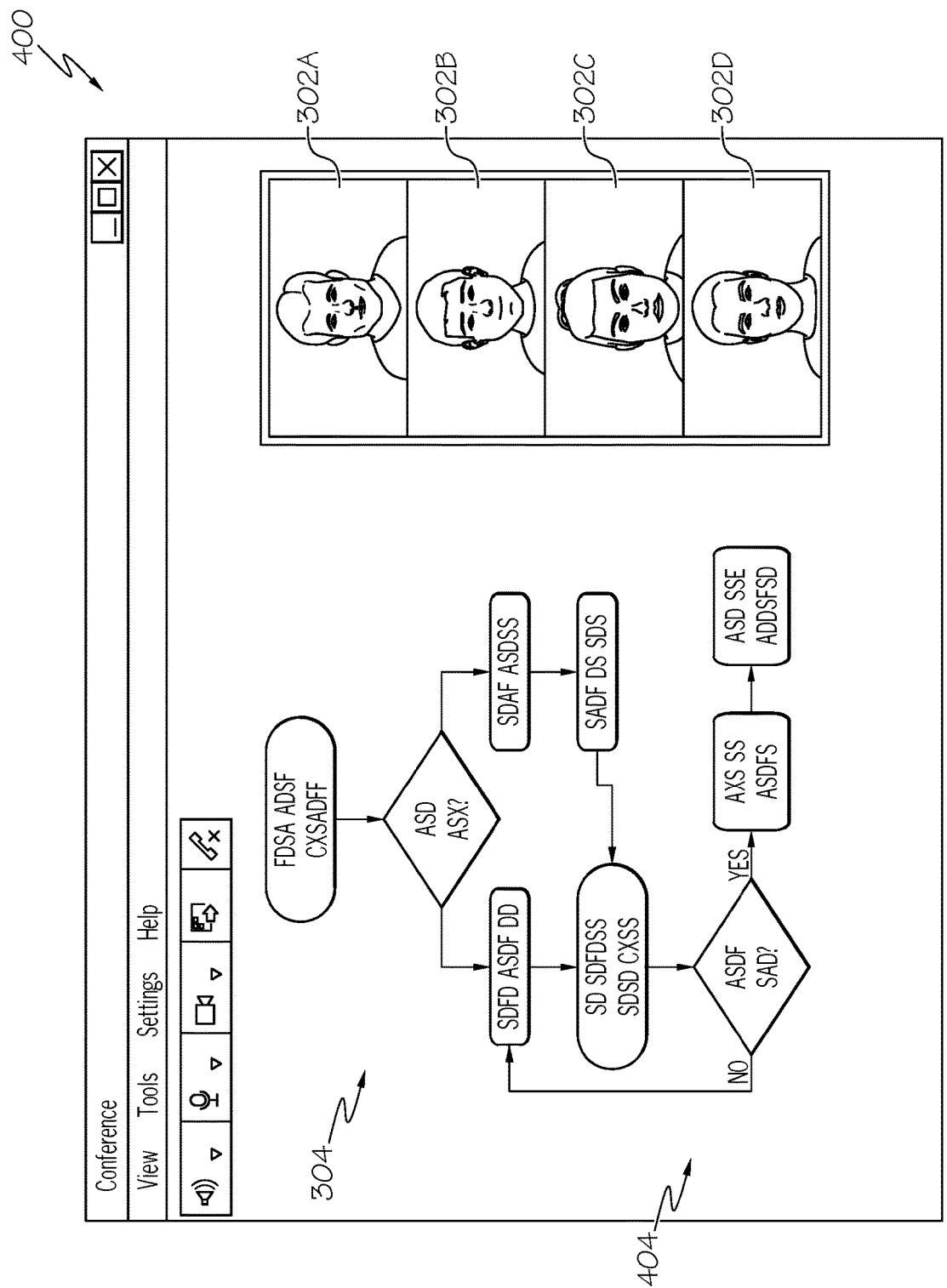
FIG. 6 shows an example display 400 including graphical notation 404 according to an illustrative embodiment of the present invention.

FIG. 6 shows an example display 400 of a user (Joan, in this example) participating in a video conference. As shown, display 400 includes graphical notation 404 made by Joan during the discussion. As previously mentioned, assume user engagement component 52 has determined Abe 302A is experiencing confusion based on his facial expressions and/or body language. Further, graphical notation recognition component 54 has detected Joan has created graphical notation 404 on her instance of diagram 304 as the discussion proceeds. Graphical notation correlation component 56 then determines whether a correlation exists between Joan's graphical notation 404 and the video conference. To that end, Joan's graphical notation 404 is compared against a baseline to determine whether Joan is altering the initial flow diagram in a meaningful way (e.g., adding process blocks, adding decision points, etc.) or sketching something unrelated to the meeting, such as a cartoon character. In this example, the initial flow diagram (or subsections of the initial flow diagram) can be used as the baseline. Alternatively, a common image type (i.e., a generic workflow) could be used as a baseline. Graphical notation 404 is assessed to infer deviation from the baseline. In an embodiment, an image cross-correlation function can be used for quantifying a difference between the graphical notation and other graphical notations/images. In another embodiment, any method, now known or later developed, for quantifying a difference may be used.

Alternatively or in addition, any text in graphical notation 404 can be compared against video conference text (e.g., a meeting description, meeting notes, etc.) and/or metadata/text related to a baseline to assist in deriving a deviation. Any natural language processing (NLP) techniques, now known or later developed, may be employed to determine similarity and/or relatedness of the text. In any case, if the derived deviation is below a predefined threshold, a correlation between the graphical notation and video conference is assumed. Otherwise, it is determined to be unrelated. If related, the graphical notation can be used as a motivation to understand a concept or to act as a catalyst for additional graphical notations.

Figure 7:
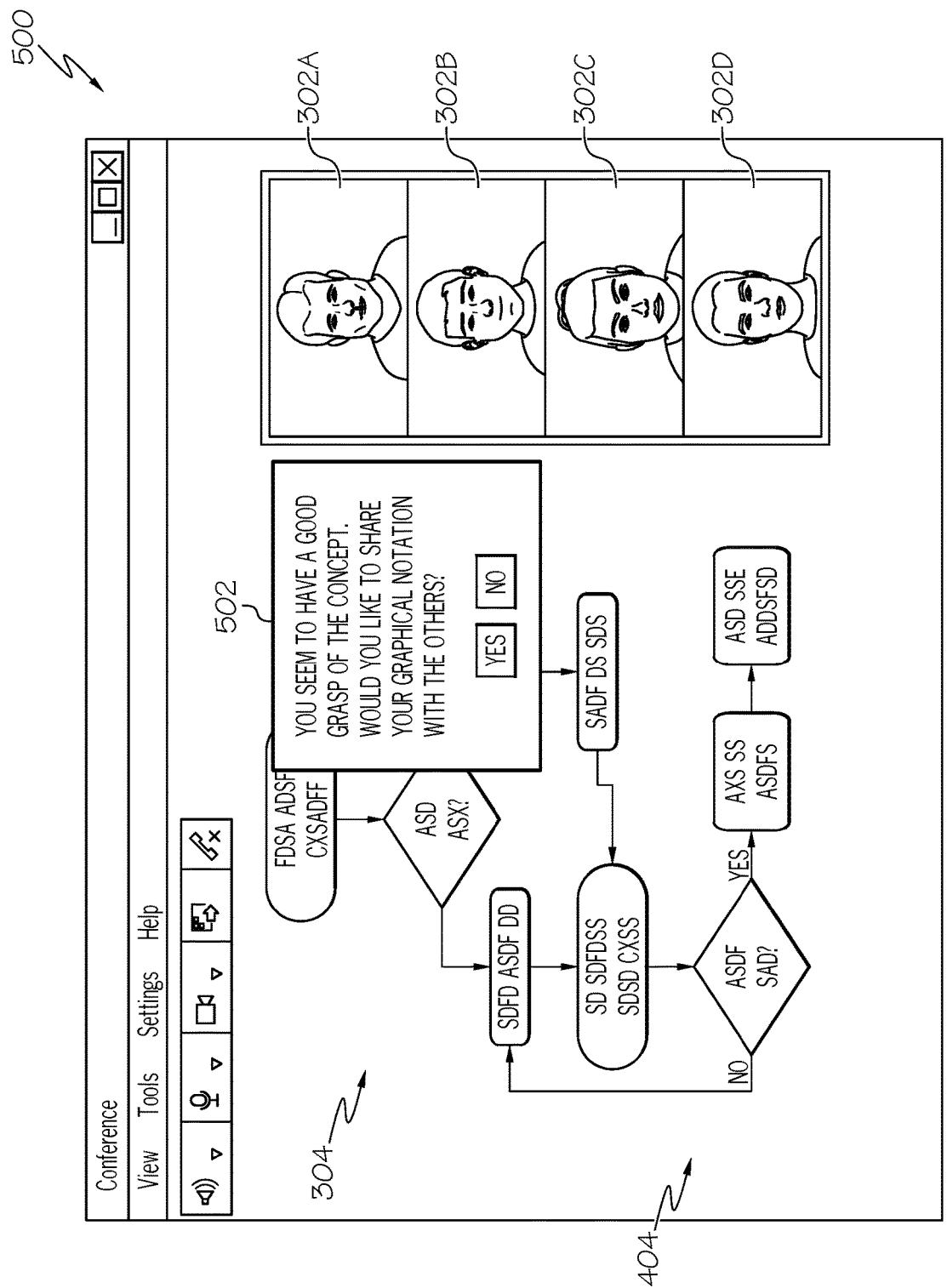
FIG. 7 shows an example display 500 including pop-up box 502 according to an illustrative embodiment of the present invention.

Graphical notation dissemination component 58, as executed by computer system/server 12, is configured to, based on a user response, share a graphical notation with one or more other video conference participants. In an embodiment, upon determining that a graphical notation (e.g., a graphical notation) may be useful to other participants in a video conference, graphical notation dissemination component 58 can query a user who has created the graphical notation as to whether the graphical notation may be shared with the others. FIG. 7 shows an example display 500 for asking a user (e.g., Joan) who has created a graphical notation if she would like to share with the other participants. As shown, display 500 includes pop-up box 502 including the query and yes/no answer options. If Joan answers affirmatively, then graphical notation dissemination component 58 may display graphical notation 404 to each of the other participants in the video conference.

In another embodiment, a user having been determined as confused may be asked if he would like to see a graphical notation that another participant has created to increase his understanding. Referring back to the earlier example, user engagement component 52 determined Abe 302A was confused. In this case, graphical notation dessimiation component 58 may query Abe 302A (e.g., via pop-up box) as to whether he would like to see graphical notation 404 to help his understanding of what is being discussed. If he selects 'yes', graphical notation dissemination component 52 can present graphical notation 404 on his display.

In yet another embodiment, as user having been determined as disinterested or unfocused during the video conference may be asked if she would like to create a graphical notation (e.g., a graphical notation) to help her become more engaged. Assume user engagement component 52 has identified Betty 302C as being disinterested during the meeting based on her facial expressions and body language. Graphical notation dissemination component 58 may query Betty 302C (e.g., via pop-up box) whether she would like to create a graphical notation to help her become more engaged. If she agrees, graphical notation dissemination component 58 can display an existing graphical notation or part of an existing graphical notation on her display to get her started.

Figure 8:
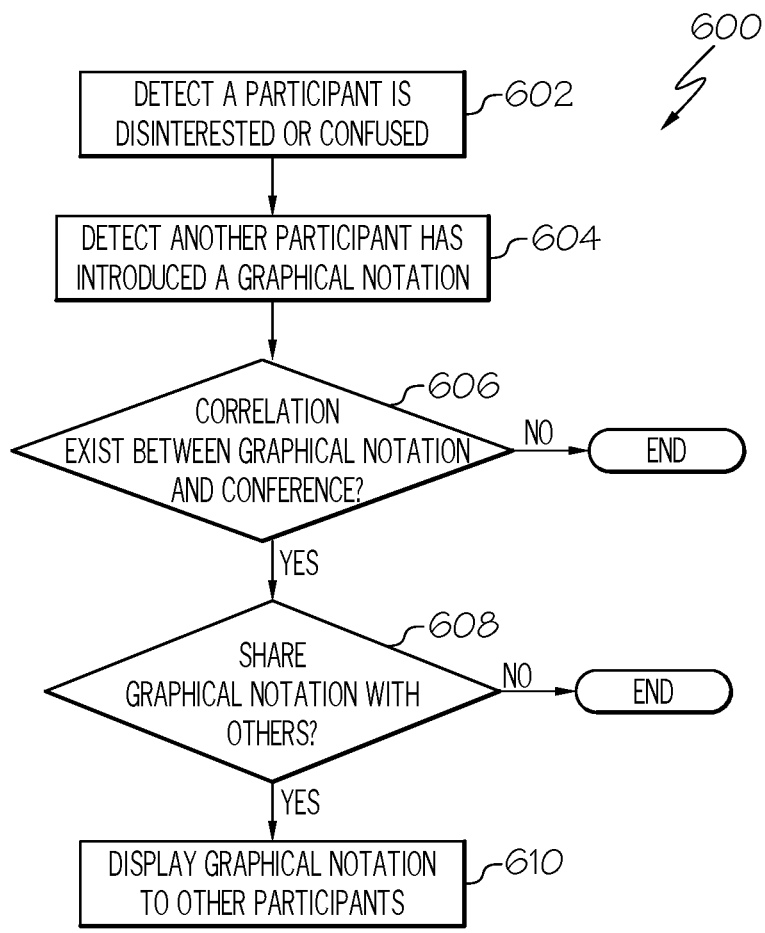
FIG. 8 shows an example process flowchart 600 for determining, based on a dynamic analysis of user engagement during a video conference, a need for a workspace graphical notation to increase user engagement in the video conference according to an illustrative embodiment of the present invention.

Referring now to FIG. 8, in conjunction with FIG. 4, an implementation of a process flowchart 600 for determining, based on a dynamic analysis of user engagement during a video conference, a need for a workspace graphical notation (e.g., a graphical notation) to increase user engagement in the video conference is shown. At 602, user engagement component 52 determines whether a participant is disinterested or confused during a video conference. At 604, graphical notation recognition component 54 detects when another participant has introduced (e.g., creating, uploading, etc.) a graphical notation during the conference. At 606, graphical notation correlation component 56 determines whether the graphical notation is correlated to the conference. If so, at 608, graphical notation dissemination component 58 prompts the participant who has introduced the graphical notation whether he would like to share the graphical notation with the others to facilate a greater understanding and/or to increase engagement in the conference. If so, at 610, graphical notation dissemination component 58 displays the graphical notation to the other participants of the video conference.

Process flowchart 600 of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for determining, based on a dynamic analysis of user engagement during a video conference, a need for a workspace graphical notation to increase user engagement in the video conference. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for determining, based on a dynamic analysis of user engagement during a video conference, a need for a workspace graphical notation to increase user engagement in the video conference. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for determining, based on a dynamic analysis of user engagement during a video conference, a need for a workspace graphical notation to increase user engagement in the video conference. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for increasing user engagement in a video conference, comprising:
   estimating a user engagement status of a first participant;
   identifying, based on the user engagement status, a second participant who has introduced a graphical notation;
   determining whether a correlation exists between the graphical notation and the video conference;
   prompting, when a correlation exists between the graphical notation and video conference, the second participant to share the graphical notation with the first participant;
   prompting, when a correlation exists between the graphical notation and the video conference, the first participant to view the graphical notation, wherein the correlation exists between the graphical notation and the video conference when a deviation between the graphical notation and a baseline is below a predefined threshold; and
   dynamically displaying, in response to an affirmative response from the second participant, the graphical notation to the first participant.

2. The computer-implemented method of claim 1, wherein introducing a graphical notation includes creating a graphical notation during the video conference.

3. The computer-implemented method of claim 1, wherein the user engagement status is selected from a group comprising disinterest or confusion.

4. The computer-implemented method of claim 1, further comprising deriving the deviation, wherein the deriving includes performing a clustering technique.

5. The computer-implemented method of claim 1, wherein the baseline is derived based on one or more images.

* * * * *